US012735008B2

(12) United States Patent
Macnamara et al.

(10) Patent No.: US 12,735,008 B2
(45) Date of Patent: Sep. 15, 2026

(54) SYSTEM AND METHOD FOR ENSURING SAFE PULL AWAY OF A VEHICLE FROM CONNECTED INFRASTRUCTURE

(71) Applicant: Bendix Commercial Vehicle Systems LLC, Avon, OH (US)

(72) Inventors: Joseph M. Macnamara, Ashland, OH (US); Joseph M. Goetz, Avon, OH (US); Yousef Shousha, Cleveland, OH (US); Brandon M. Hadley, Bryan, TX (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 410 days.

(21) Appl. No.: 18/421,582

(22) Filed: Jan. 24, 2024

(65) Prior Publication Data

US 2025/0236274 A1 Jul. 24, 2025

(51) Int. Cl.
*B60T 8/58* (2006.01)
*B60T 8/171* (2006.01)
*B60T 8/34* (2006.01)

(52) U.S. Cl.
CPC ................ *B60T 8/58* (2013.01); *B60T 8/171* (2013.01); *B60T 8/341* (2013.01); *B60T 2240/00* (2013.01); *B60T 2250/04* (2013.01)

(58) Field of Classification Search
CPC . B60T 8/58; B60T 8/171; B60T 8/341; B60T 2240/00; B60T 2250/04
See application file for complete search history.

(56) References Cited

U.S. PATENT DOCUMENTS

| | | | |
|---|---|---|---|
| 5,139,315 A * | 8/1992 | Walenty | B60T 7/12 303/162 |
| 6,712,171 B2 | 3/2004 | Farmer | |
| 8,132,639 B2 * | 3/2012 | Zuck | B60K 28/10 141/346 |
| 8,210,306 B2 * | 7/2012 | Zuck | B60K 28/10 141/346 |

(Continued)

FOREIGN PATENT DOCUMENTS

EP 2189705 A1 5/2010

OTHER PUBLICATIONS

Canadian Patent No. CA 3210055 to Reifman et al published on Mar. 12, 2024.*

*Primary Examiner* — Pamela Rodriguez
(74) *Attorney, Agent, or Firm* — Reising Ethington P.C.

(57) ABSTRACT

A system is provided for inhibiting movement of a vehicle away from infrastructure temporarily connected with the vehicle. A sensor indicates whether the vehicle is connected with the infrastructure. A valve controls delivery of fluid pressure to a service brake on the vehicle. A controller determines whether the vehicle is in an armed state permitting application of the service brake when a set of conditions is present in which the parking brake is released, the speed of the vehicle meets a predetermined condition relative to a threshold speed, and the vehicle is connected with the infrastructure or a disarmed state prohibiting application of the service brake when the set of conditions is present. If the set of conditions is present while in the armed state, the controller directs the valve to apply the service brake.

33 Claims, 4 Drawing Sheets

(56) References Cited

U.S. PATENT DOCUMENTS

| | | | | |
|---|---|---|---|---|
| 2003/0150417 | A1* | 8/2003 | Miwa | F02N 11/0833 123/179.4 |
| 2020/0114896 | A1* | 4/2020 | Kennedy | B60T 13/263 |
| 2022/0410857 | A1* | 12/2022 | Li | B60T 8/92 |
| 2024/0017701 | A1* | 1/2024 | van Thiel | B60T 7/12 |
| 2025/0388195 | A1* | 12/2025 | Mokashi | B60T 7/12 |

* cited by examiner

SYSTEM AND METHOD FOR ENSURING SAFE PULL AWAY OF A VEHICLE FROM CONNECTED INFRASTRUCTURE

BACKGROUND OF THE INVENTION a. Field of the Invention

This disclosure relates to a system and method for inhibiting movement of a vehicle away from infrastructure temporarily connected with the vehicle. In particular, this disclosure relates to a system and method that generate an interlock to inhibit movement of the vehicle from connected infrastructure while also preventing inadvertent generation of the same interlock during vehicle travel.

b. Background Art

Vehicles are often temporarily connected to various types of fixed infrastructure for a variety of reasons. For example, a vehicle may be connected to a fuel pump or charger to provide liquid fuels or electricity to power movement of the vehicle or for other functions (e.g., cooling in a refrigerated trailer). Vehicles such as tankers that transport solid or liquid goods may be connected to infrastructure configured, for example, to deliver the goods to the vehicle or receive the goods from the vehicle.

When connected to fixed infrastructure, vehicles are typically stationary. If the operator of the vehicle attempts to move the vehicle while the vehicle is still connected to the infrastructure, significant damage can occur to the one or both of the vehicle and infrastructure. In addition, any disconnection resulting from movement of the vehicle may result in loss of fuels or goods, and depending on the type of fuels or goods, environmental contamination and a risk of fire or explosion. As a result, the costs and risks associated with an unintended disconnection between the vehicle and connected infrastructure are significant.

To address these problems, various systems have been developed that attempt to limit or prevent unintentional disconnections between vehicles and connected infrastructure. Some conventional systems include sensors that attempt to indicate whether or not the vehicle is connected to the infrastructure. For example, a sensor may indicate whether an access door to a fuel tank or to a goods storage tank is open or closed. If the sensor indicates the vehicle is still connected to the infrastructure, some systems generate a warning to the vehicle operator if the operator attempts to move the vehicle. Vehicle operators may, however, overlook or simply ignore such warnings. Other systems will attempt to prevent movement of the vehicle by the operator while the vehicle is still connected to the infrastructure. These systems, however, often rely on identifying conditions that may also occur during normal vehicle travel. In the example given above, the access door to a fuel tank or goods storage tank may be left open by the operator after disconnection from the infrastructure or come open during vehicle travel as a result of a mechanical failure. Halting movement of the vehicle in this situation may result in inconvenience or safety risks for the operator or persons in the vicinity of the vehicle, damage to the vehicle and safety risks for the vehicle and other vehicles in the vicinity. Some systems have attempted to address this issue by comparing the speed of the vehicle to a threshold speed in deciding whether to prevent movement of the vehicle. These systems rely on the theory that the vehicle will have a relatively high speed during the vehicle travel and a relatively low speed (typically zero) when connected to infrastructure. Such systems, however, still fail to account for situations in which the vehicle travels at relatively low speeds in the course of vehicle travel. For example, a vehicle may travel at relatively low speeds during heavy traffic or when encountering obstacles in the course of travel (e.g., when crossing railway tracks). Preventing movement of the vehicle in these situations may again result in inconvenience or safety risks for the operator or other persons in the vicinity of the vehicle, damage to the vehicle and safety risks for the vehicle and other vehicles in the vicinity.

The inventors herein have recognized a need for a system and method for inhibiting movement of a vehicle away from infrastructure temporarily connected with the vehicle that will minimize and/or eliminate one or more of the above-identified deficiencies.

BRIEF SUMMARY OF THE INVENTION

This disclosure relates to a system and method for inhibiting movement of a vehicle away from infrastructure temporarily connected with the vehicle. In particular, this disclosure relates to a system and method that generate an interlock to inhibit movement of the vehicle from connected infrastructure while also preventing inadvertent generation of the same interlock during vehicle travel.

One embodiment of a system for inhibiting movement of a vehicle away from infrastructure temporarily connected with the vehicle includes an infrastructure connection sensor on the vehicle configured to generate an infrastructure connection signal indicative of whether the vehicle is connected with the infrastructure or unconnected with the infrastructure. The system further includes a valve configured to control delivery of fluid pressure to a service brake on the vehicle. The system further includes a controller configured to receive the infrastructure connection signal, receive a parking brake status signal indicative of whether a parking brake on the vehicle is in an applied state or a released state and receive a vehicle speed signal indicative of a speed of the vehicle. The controller is further configured to determine whether the vehicle is in (i) an armed state permitting application of the service brake when a set of conditions is present in which the parking brake status signal indicates that the parking brake is in the released state, the speed of the vehicle meets a predetermined condition relative to a threshold speed, and the infrastructure connection signal indicates the vehicle is connected with the infrastructure or (ii) a disarmed state prohibiting application of the service brake when the set of conditions is present. The controller is further configured to determine whether the set of conditions is present and direct, when the vehicle is in the armed state and the set of conditions is present, the valve to assume a first state in which the valve causes application of the service brake.

One embodiment of an article of manufacture includes a non-transitory computer storage medium having a computer program encoded thereon that when executed by a controller inhibits movement of a vehicle away from infrastructure temporarily connected with the vehicle. The computer program includes code for receiving an infrastructure connection signal indicative of whether the vehicle is connected with the infrastructure or unconnected with the infrastructure, receiving a parking brake status signal indicative of whether a parking brake on the vehicle is in an applied state or a released state and receiving a vehicle speed signal indicative of a speed of the vehicle. The computer program further includes code for determining whether the vehicle is in (i) an armed state permitting application of a service brake on the vehicle when a set of conditions is present in which the parking brake status signal indicates that the parking brake is in the released state, the speed of the vehicle meets a predetermined condition relative to a threshold speed, and the infrastructure connection signal indicates the vehicle is connected with the infrastructure or (ii) a disarmed state prohibiting application of the service brake when the set of conditions is present. The computer program further includes code for determining whether the set of conditions is present and directing, when the vehicle is in the armed state and the set of conditions is present, the valve to assume a first state in which the valve causes application of the service brake.

One embodiment of a method for inhibiting movement of a vehicle away from infrastructure temporarily connected with the vehicle includes receiving an infrastructure connection signal indicative of whether the vehicle is connected with the infrastructure or unconnected with the infrastructure, receiving a parking brake status signal indicative of whether a parking brake on the vehicle is in an applied state or a released state, and receiving a vehicle speed signal indicative of a speed of the vehicle. The method further includes determining whether the vehicle is in (i) an armed state permitting application of a service brake on the vehicle when a set of conditions is present in which the parking brake status signal indicates that the parking brake is in the released state, the speed of the vehicle meets a predetermined condition relative to a threshold speed, and the infrastructure connection signal indicates the vehicle is connected with the infrastructure or (ii) a disarmed state prohibiting application of the service brake when the set of conditions is present. The method further includes determining whether the set of conditions is present and directing, when the vehicle is in the armed state and the set of conditions is present, the valve to assume a first state in which the valve causes application of the service brake.

A system and method for inhibiting movement of a vehicle away from infrastructure temporarily connected with the vehicle in accordance with the teachings disclosed herein is advantageous relative to conventional systems. Using information regarding the current state of the vehicle in addition to the state of connection of the vehicle to the infrastructure, the speed of the vehicle and the status of the vehicle parking brake, the system and method are able to inhibit movement of the vehicle when the vehicle is connected to infrastructure, but also avoid false positives that may occur during vehicle travel including during periods of vehicle travel when the vehicle is traveling at relatively low speeds or idle. As a result, the system and method inhibit movement of a vehicle away from connected infrastructure without creating additional risks of damage to the vehicle or surrounding vehicles during vehicle travel or safety risk or inconvenience for the vehicle operator or other persons in the vicinity of the vehicle.

The foregoing and other aspects, features, details, utilities, and advantages of the present teachings will be apparent from reading the following description and claims, and from reviewing the accompanying drawings.

DETAILED DESCRIPTION OF THE INVENTION

Figure 1:
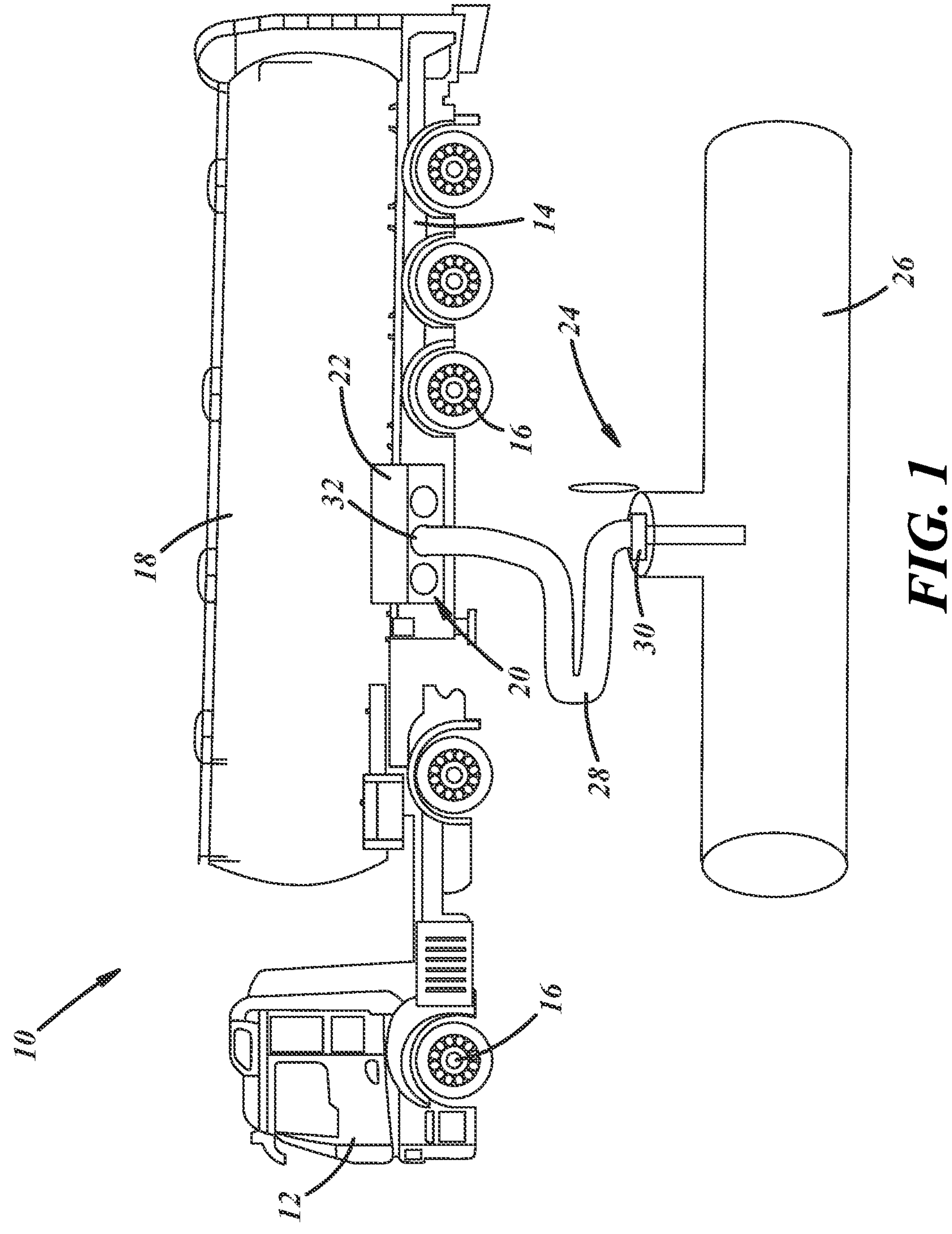
FIG. 1 is a diagrammatic view of a vehicle incorporating a system for inhibiting movement of a vehicle away from infrastructure temporarily connected with the vehicle in accordance with the teachings set forth herein.

Referring now to the drawings wherein like reference numerals are used to identify identical components in the various views, FIG. 1 illustrates a vehicle 10. In the illustrated embodiment, vehicle 10 comprises a heavy commercial vehicle and, in particular, a combination vehicle (tractor-trailer) in the form of a fuel tanker. It should be understood, however, that the systems and methods disclosed herein may find application on other types of commercial and non-commercial vehicles including both combination and non-combination vehicles and including, but not limited to, for example, other types of tankers (e.g., food tankers, water tankers, chemical tankers, dry bulk tankers, and asphalt tankers) refrigerated tractor-trailers, cement mixers and trains. Vehicle 10 includes a towing member or tractor 12 and a towed member or semi-trailer 14.

Tractor 12 provides power for moving semi-trailer 14. Tractor 12 includes steering and drive axles each of which support one or more wheels 16 at either end. Tractor 12 further includes a power unit, such as an internal combustion engine or electric motor for generating mechanical energy used to rotate wheels 16 and a battery for use in starting the power unit and for use by the power unit in generating the mechanical energy used to drive wheels 16. The battery may also provide power to various systems on vehicle 10.

Semi-trailer 14 is provided to carry or store freight and is detachably coupled to tractor 12. Although a single semi-trailer 14 is shown in the illustrated embodiment, it should be understood that the number of semi-trailers attached to tractor 12 may vary. Semi-trailer 14 is supported on one or more trailer axles, each of which may support one or more wheels 16 at either end. In the illustrated embodiment, semi-trailer 14 is provided for transporting liquid fuels and includes a fuel tank 18. Fuel may be unloaded from tank 18 through one or more ports accessed within a fuel cabinet 20. Access to the cabinet 20 is controlled by a door 22 that may assume a closed position preventing access to the interior of cabinet 20 and an open position permitting access to the interior of cabinet 20.

One or both of tractor 12 and semi-trailer 14 may be configured for temporary connection to fixed infrastructure 24 for the purpose of providing products (e.g., liquid fuels, compressed gasses) or electricity to provide power to the stationary vehicle 10 (e.g., shore power for refrigerated trailers and/or power for charging batteries on vehicle 10) and/or for loading and unloading of goods to or from vehicle 10. In the illustrated embodiment, infrastructure 24 includes a below ground fuel tank 26 and a hose 28 that extends between a connector 30 associated with fuel tank 26 and a corresponding connector 32 on vehicle 10 within cabinet 20. It should be understood, however, that vehicle 10, or other types of vehicles, may be temporarily connected to a variety of different types of infrastructure relative to infrastructure 24 shown in FIG. 1. For example, vehicle 10, or another vehicle, may be temporarily connected to infrastructure comprising a fuel pump and fuel hose through which fuel is delivered to a fuel tank on the vehicle for storing fuel. Vehicle 10, or another vehicle, may alternatively be temporarily connected to infrastructure comprising an electrical power source such as an external battery or a charging station connected to an electrical grid and a cable through which power is delivered from a connector on the power source to a connector on the vehicle that is in turn connected to a battery or other electrical device (e.g., a power storage device or an electric motor) on the vehicle for storing power used in powering vehicles relying on electric motors. An access door on vehicle 10 may control access to the fuel tank on vehicle 10 or electrical connector on vehicle 10. Different types of vehicles, relative to vehicle 10, may also be temporarily connected to different types of infrastructure for loading and unloading goods from the vehicle depending on the nature of the goods carried by the vehicle.

Figure 2:
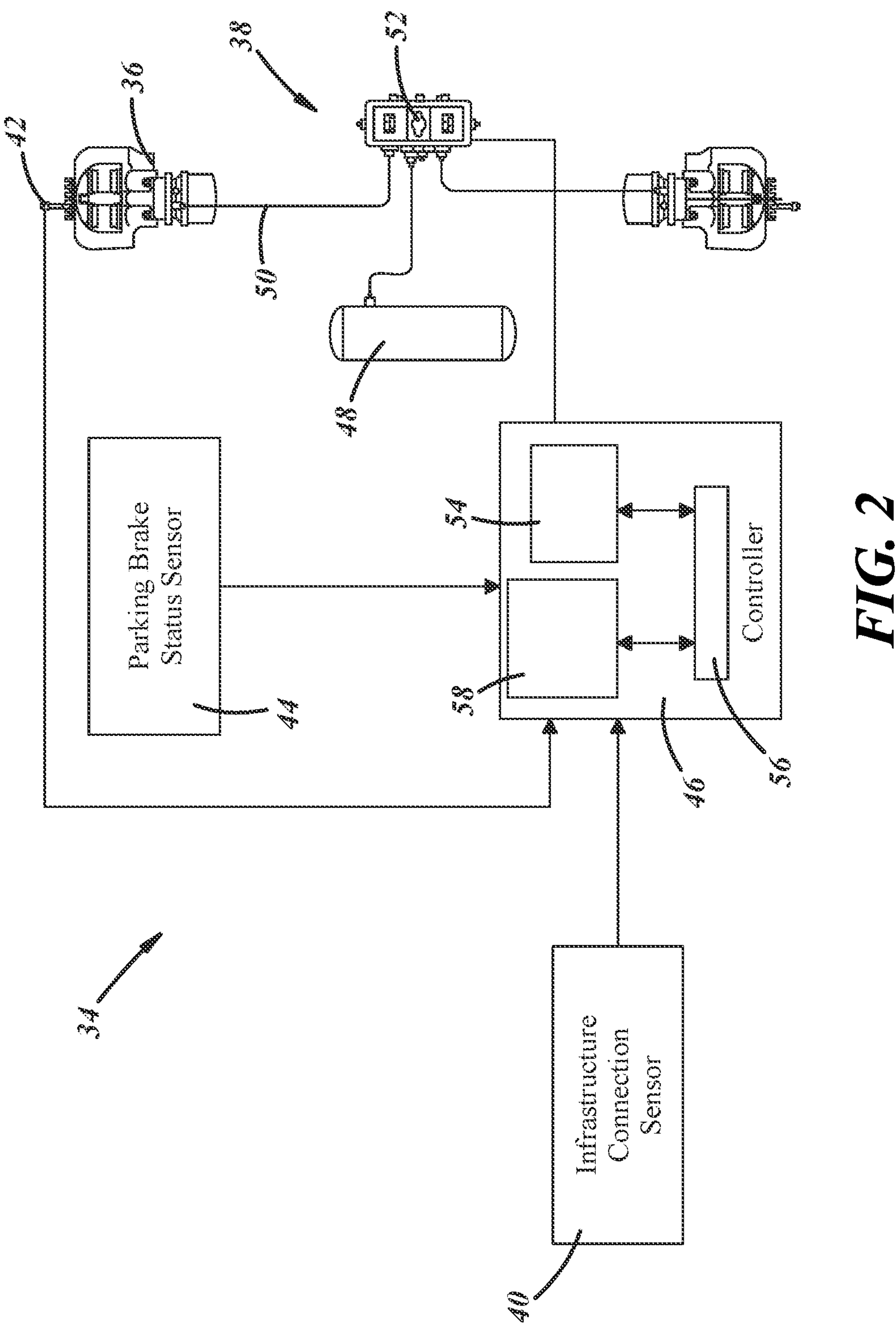
FIG. 2 is a diagrammatic view of one embodiment of a system for inhibiting movement of a vehicle away from infrastructure temporarily connected with the vehicle in accordance with the teachings set forth herein.

Referring now to FIG. 2, in accordance with the present teachings, vehicle 10 includes a system 34 for inhibiting movement of vehicle 10 away from infrastructure 24 temporarily connected with vehicle 10. System 34 includes components of a braking system for vehicle 10 that is provided to slow, stop or prevent movement of vehicle 10. In the illustrated embodiment, system 34 includes wheel brakes 36 and a fluid circuit 38 that supplies fluid pressure to wheel brakes 36. In an alternative embodiment, system 34 may include an engine brake in addition to, or as an alternative to one or more wheel brakes 36. In the illustrated embodiment, wheel brakes 36 and components of a fluid circuit 38 for braking wheels 16 on a single axle of vehicle 10 are illustrated. It should be understood, however, that the braking system, and therefore system 34, may include similar components for use in braking wheels 16 on additional axles of vehicle 10. System 34 may further include various sensors that provide information regarding the operation of vehicle 10 and/or the operating environment for vehicle 10 including an infrastructure connection sensor 40, a wheel speed sensor 42, and a parking brake status sensor 44. System 34 may further include one or more controllers 46.

Wheel brakes 36 are configured to apply a braking force to one or more wheels 16. In the illustrated embodiment, brakes 36 comprise disc brakes in which a carrier supports brake pads on opposite sides of a rotor rotating with the wheel 16 and an actuator causes, responsive to fluid pressure delivered by fluid circuit 38, movement of a caliper relative to the carrier to move the brake pads into and out of engagement with the rotor. Alternatively, wheel brakes 36 may comprise drum brakes in which an actuator such as a cam or piston causes, responsive to fluid pressure delivered by circuit 38, movement of one or more brake shoes into engagement with a braking surface in a brake drum rotating with the wheel 16. Each wheel brake 36 may be configured to function as both a service brake for applying service braking while vehicle 10 is an active state or inactive state and as a parking brake for applying parking or emergency braking while vehicle 10 is an active or inactive state.

Fluid circuit 38 generates fluid pressure within the braking system and controls the delivery of fluid pressure to the actuator of each wheel brake 36. Circuit 38 may include components for generating and storing pressurized fluid including fluid reservoir 48 and components for routing and delivering fluid pressure to wheel brakes 36 including fluid conduits 50 and valves 52 (only one of which is shown in the illustrated embodiment).

Fluid reservoir 48 stores compressed fluid for use in applying wheel brakes 36. Reservoir 48 supplies pressurized fluid to the wheel brakes 36.

Fluid conduits 50 are used to transport fluid between reservoir 48, valve 52 and wheel brakes 36. Conduits 50 may be made from conventional metals, plastics and/or rubber compounds and have connectors at either end configured to join the conduits 50 to corresponding components of circuit 38.

Valve 52 is provided to control delivery of fluid pressure to wheel brakes 36. In one embodiment, valve 52 may comprise a version of an electro-pneumatic brake control valve offered for sale by the applicant Bendix Commercial Vehicle Systems LLC under the name "TABS 6™ Advanced Multi Channel." Valve 52 includes a relay valve that delivers fluid pressure from reservoir 48 to wheel brakes 36 or exhausts fluid pressure from wheel brakes 36 responsive to a control pressure. The relay valve increases the volume of fluid, and therefore the flow, at which fluid is delivered to, and exhausted from, wheel brakes 36 in order to reduce lag times between the commanded and actual application and release of wheel brakes 36. Valve 52 further includes solenoid valves configured to establish the control pressure and, therefore, control the operation of the relay valve. An electronic control unit in valve 52 controls the operation of the solenoid valves responsive to control signals from controller 46 and may further process signals from a pressure sensor within valve 52 and from wheel speed sensors 42 associated with wheels 16 and wheel brakes 36, respectively, at each end of the axle. Valve 52 may generate signals indicative of fluid pressure and wheel speed and transmit those signals to controller 46 and other vehicle systems over a conventional vehicle communications bus implementing a communications network such as a controller area network (CAN) or local interconnect network (LIN) or over a vehicle power line through power line communication (PLC) in accordance with various industry standard protocols including by not limited to SAE J1939, ISO 11898, and SAE J2497 or using a proprietary protocol.

Infrastructure connection sensor 40 is configured to generate an infrastructure connection signal indicative of whether vehicle 10 is connected with infrastructure 24 or unconnected with infrastructure 24. Infrastructure connection sensor 40 may assume a variety of forms depending on the type of vehicle 10, the type of infrastructure 24 and the nature of the connection between vehicle 10 and infrastructure 24. In some embodiments, infrastructure connection sensor 40 may comprise a position sensor configured to determine whether a door on the vehicle 10 controlling access to a connector for the infrastructure 24 is in an open position or a closed position. Referring to the vehicle 10 illustrated in FIG. 1, infrastructure connection sensor 40 may comprise an absolute position sensor configured to generate a signal indicative of whether door 22 is open, thereby indicating a possible connection between vehicle 10 and infrastructure 24, or closed, thereby indicating a lack of connection between vehicle 10 and infrastructure 24. A variety of different position sensors may be used for this purpose including, but not limited to, potentiometers, Hall effect sensors, and inductive sensors. Similar position sensors may be used to indicate a connection between vehicle 10 or another vehicle and infrastructure for providing liquid fuels used in powering vehicle 10. In particular, the sensors may indicate whether an access door to the vehicle's fuel tank is open, thereby indicating a potential connection between vehicle 10 and infrastructure such as a fuel pump and hose, or closed, thereby indicating a lack of connection between the vehicle and the fuel pump and hose. In another embodiment, connection sensor may comprise a current sensor on vehicle 10 configured to determine whether current is flowing from infrastructure 24 to vehicle 10. For example, in embodiments where vehicle 10 is driven using electric motors as opposed to an internal combustion engine or where the vehicle includes a refrigerated tractor or trailer, vehicle 10 may be temporarily connected to infrastructure comprising a charging station that delivers electrical power from a power source such as a battery or the electrical grid to vehicle 10 through one or more conductors. A current sensor (e.g., an electrical relay or tristate relay) proximate an electrical connector on vehicle 10 that is configured for connection to an end of the conductor opposite the charging station may indicate whether current is flowing into vehicle 10, thereby indicating a potential connection between vehicle 10 and infrastructure 24, or not flowing, thereby indicating a lack of connection between vehicle 10 and infrastructure 24. Although a single sensor 40 is shown in the illustrated embodiment, alternative embodiments may include additional, redundant sensors 40 that operate in a similar manner to allow for the possible malfunction of one of the sensors 40.

Wheel speed sensor 42 is configured to generate a vehicle speed signal indicative of a speed of vehicle 10 by measuring the rotational speed of wheel 16. Sensor 42 is conventional in the art and may, for example, comprise a Hall effect sensor that senses rotation of a tone wheel configured for rotation with wheel 16. Sensor 42 may provide the vehicle speed signal to the electronic control unit of valve 52 and/or controller 46 for use in various functions including anti-lock braking and vehicle stability control.

Parking brake status sensor 44 is configured to generate a parking brake status signal indicative of whether a parking brake on vehicle 10 is in an applied state or a released state. Sensor 44 may, for example, comprise a pressure sensor configured to indicate whether fluid pressure in a fluid chamber of the brake actuator used to overcome the force of a spring in the actuator is absent, thereby indicating that the parking brake is in an applied state, or present, thereby indicating that the parking brake is in a released state. Although a single sensor 44 is shown in the illustrated embodiment, alternative embodiments may again include additional, redundant sensors 44 that operate in a similar manner to allow for the possible malfunction of one of the sensors 44.

Controller 46 is provided to control the operation of valve 52 in order to apply the service brake in wheel brake 36 in situations in which vehicle 10 remains connected to infrastructure 24, but a parking brake on vehicle 10 is released by the operator or through malfunction. In the illustrated embodiment, controller 46 is illustrated separately from valve 52. It should be understood, however, that controller 46 may alternatively be integrated with valve 52 as part of the electronic control unit in valve 52. Controller 46 may comprise a programmable microprocessor or microcontroller or may comprise an application specific integrated circuit (ASIC). Controller 46 may include a memory 54 and a central processing unit (CPU) 56. Controller 46 may also include an input/output (I/O) interface 58 including a plurality of input/output pins or terminals through which the controller 46 may receive a plurality of input signals and transmit a plurality of output signals. The input signals may, for example, include signals received from sensors 40, 42, 44. The output signals may include signals used to control valve 52 and, therefore, the service brake in wheel brake 36, signals used to activate visual, audio or haptic warning systems for the vehicle operator, and signals used to communicate with operator interfaces on vehicle 10 or a telematics unit in vehicle 10 that convey information to the operator or other parties (e.g., fleet managers), respectively, regarding the state of vehicle 10 (see discussion hereinbelow) and individual components of vehicle 10 including system 34. Controller 46 may be configured to communicate with sensors 40, 42, 44 and/or valve 52 directly through interface 58 using dedicated (hard) wire connections. Alternatively, or in addition, controller 46 may be configured to communicate with sensors 40, 42, 44 and/or valve 52 over a vehicle communications bus or power line as referenced hereinabove.

Figure 3:
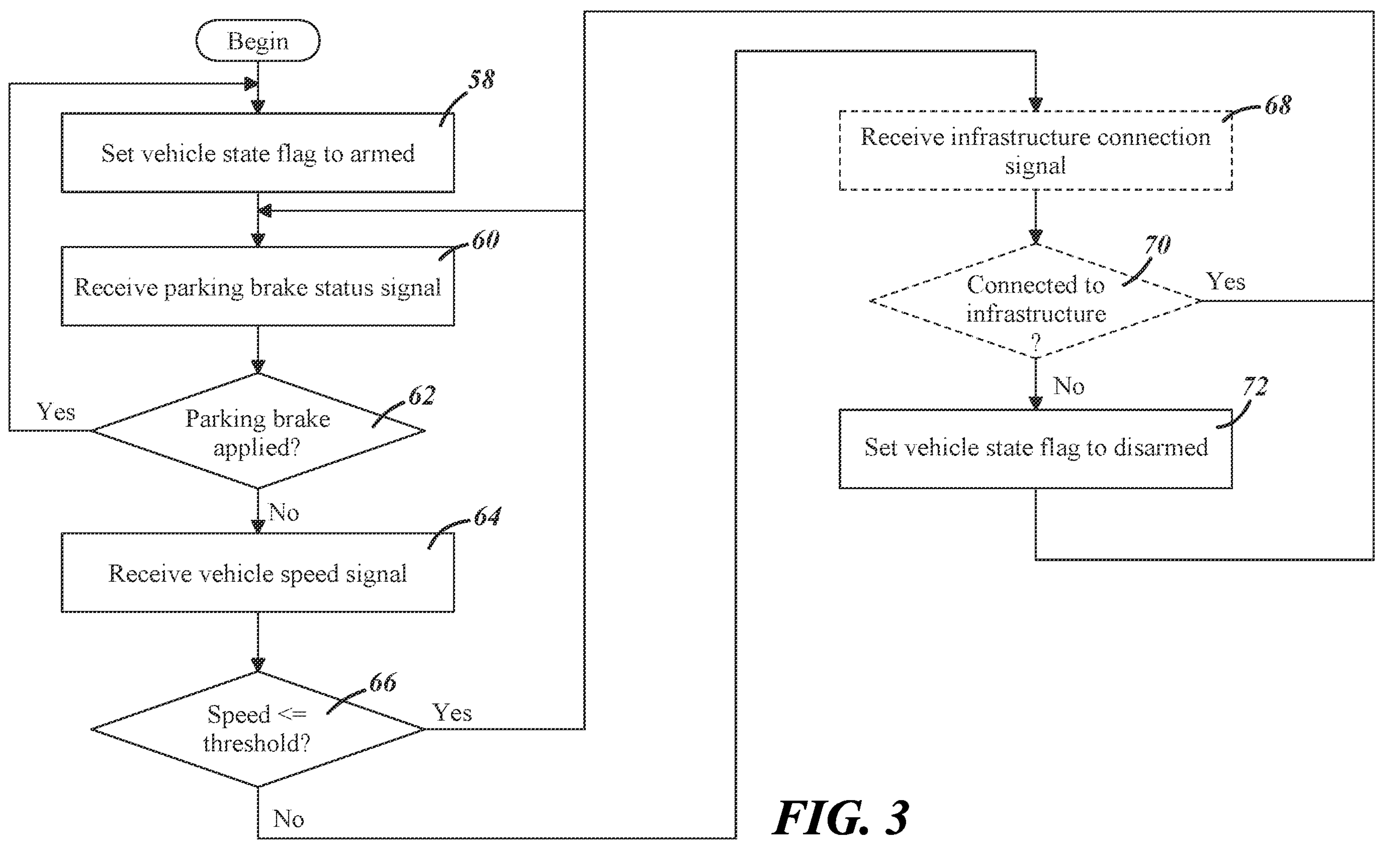
FIGS. 3-4 are flowchart diagrams illustrating one embodiment of a method for inhibiting movement of a vehicle away from infrastructure temporarily connected with the vehicle in accordance with the teachings set forth herein.
Figure 4:
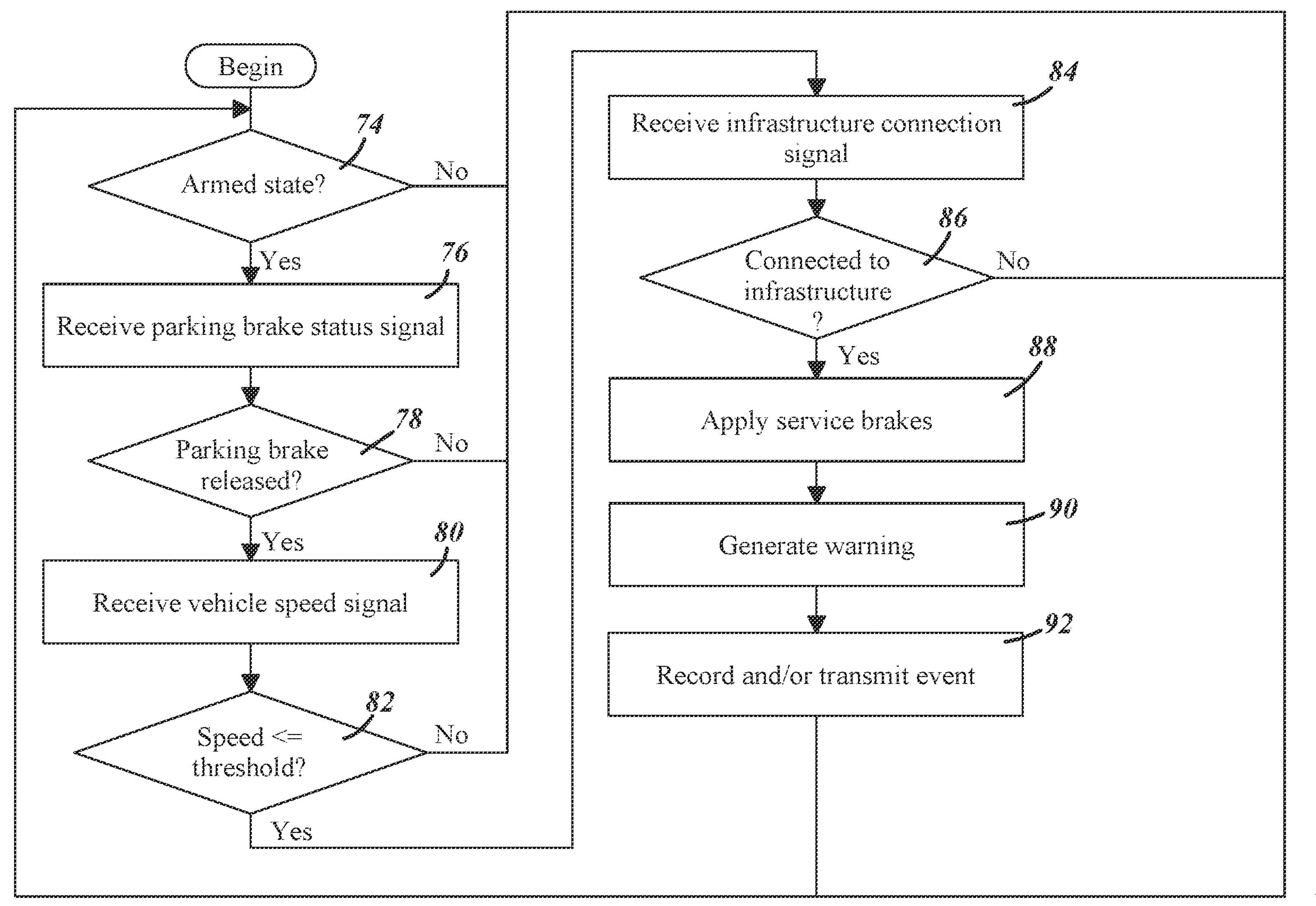

Referring now to FIGS. 3-4, controller 46 may be configured with appropriate programming instructions (i.e., software or a computer program) to implement various steps in a method for inhibiting movement of vehicle 10 away from infrastructure 24 temporarily connected with vehicle 10. The instructions or computer program may be encoded on a non-transitory computer storage medium such as memory 54 within, or accessible by, controller 46. The program and method are intended to inhibit movement of vehicle 10 when vehicle 10 is connected to infrastructure 24, but also avoid false positives that may occur during vehicle travel and particularly during periods of vehicle travel when the vehicle is traveling at relatively low speeds or idle (e.g., stop-and-go traffic).

Referring to FIG. 3, the method may include several steps intended to establish a state of the vehicle 10 and set a vehicle state flag in a memory such as memory 54 indicative of that state. In accordance with one aspect of the systems and methods disclosed herein, vehicle 10 may assume an "armed" state or a "disarmed" state. As discussed in greater detail below, when vehicle 10 in an armed state system 34 is configured to apply a service brake on vehicle (i.e., a wheel brake 36) if certain conditions are present that indicate vehicle 10 is connected to infrastructure 24. When vehicle is in a disarmed state, system 34 is prevented from applying the service brakes even when those same conditions are present. In this manner, system 34 prevents application of the service brakes in situations where the conditions may exist despite vehicle 10 being unconnected from infrastructure 24 (e.g., if door 22 opens due to a mechanical failure).

The method begins with step 58 of setting a vehicle state flag in memory 54 or another memory to the armed state. Step 58 occurs upon activation, or starting (e.g., power-up), of vehicle 10. Upon activation of vehicle 10, controller 46 may write to or overwrite a location in memory 54 storing the vehicle state flag to set the flag to the armed state. Upon activation of vehicle 10, controller 46 may also establish the values for certain constants used in performing the method. The values may, for example, include values for a threshold speed (e.g., four (4) miles per hour (mph)) for use in subsequent comparisons and values for the service brake pressure (e.g., sixty (60) pounds per square inch (psi)) that will be applied when attempting to inhibit vehicle 10 from moving away from connected infrastructure 24. The values may be obtained from memory 54. Alternatively, the values may be computed by controller 46 responsive to various inputs including, for example, the type of vehicle 10, weight of vehicle 10 and available pressure in fluid reservoir 48. In one embodiment, the weight of vehicle 10 is determined based on the pressure in an air suspension system on vehicle 10 and then used to establish the service brake pressure applied when attempting to inhibit vehicle 10 from moving away from connected infrastructure 24.

The method may continue with the steps 60, 62 of receiving a parking brake status signal indicative of whether a parking brake on vehicle 10 is in an applied state or a released state and determining whether the parking brake is in the applied state. The parking brake status signal may be received from parking brake status sensor 44. It should be understood, however, that a variety of systems and systems within vehicle 10 may monitor, and generate signals indicative of, the status of a parking brake including, for example, anti-lock braking systems, stability control systems, traction control systems, and autonomous emergency braking systems. Accordingly, controller 46 may receive a parking brake status signal indicative of whether the parking brake is in an applied state or a released state from a variety of sensors and systems on vehicle 10 other than parking brake status sensor 44. In embodiments employing multiple redundant sensors 44, if two of the sensors generate varying outputs, controller 46 may activate an audio, visual, and/or haptic warning system to alert the vehicle operator to a malfunctioning sensor (through, e.g., diagnostic trouble codes).

If controller 46 determines that the parking brake is in the applied state, the method returns to step 58. If controller 46 determines that the parking brake is in the released state, the method may continue with the steps 64, 66 of receiving a vehicle speed signal indicative of a speed of vehicle 10 and determining whether the speed of vehicle 10 meets a predetermined condition relative to a threshold speed (e.g., is less than or equal to the threshold speed). Controller 46 may receive the vehicle speed signal from wheel speed sensor 42. It should again be understood, however, that a variety of systems and systems within vehicle 10 may monitor, and generate signals indicative of, vehicle speed and/or vehicle movement above or below a threshold speed. For example, vehicle speed may be determined by a variety of sensors other than wheel speed sensors 42 including transmission shaft speed sensors. Vehicle speed may also be monitored by a variety of systems on vehicle 10 including engine and electric motor control systems, anti-lock braking systems and stability control systems and vehicle navigation (GPS) systems. Accordingly, controller 46 may receive a vehicle speed signal indicative of the speed of vehicle 10 from a variety of sensors and systems other than wheel speed sensor 42. In embodiments employing multiple redundant sensors 42, if two of the sensors generate varying outputs, controller 46 may again activate an audio, visual, and/or haptic warning system to alert the vehicle operator to a malfunctioning sensor.

If controller 46 determines that the speed of vehicle 10 meets the predetermined condition relative to threshold speed, the method may return to step 60. If controller 46 determines that the speed of vehicle 10 does not meet the predetermined condition relative to the threshold speed, the method may, in one embodiment (as illustrated in dashed blocks in FIG. 3), continue with the steps 68, 70 of receiving the infrastructure connection signal and determining whether the infrastructure connection signal indicates that vehicle 10 is connected to infrastructure 24 or unconnected with infrastructure 24 or, in, an alternative embodiment, proceed directly to step 72 in which controller 46 sets the vehicle state flag in memory 54 or another memory to the disarmed state before returning to step 62. Controller 46 may receive the infrastructure connection signal from infrastructure connection sensor 40. In embodiments employing multiple redundant sensors 40, controller 46 may be configured to determine that vehicle 10 is connected to infrastructure 24 if any one of the infrastructure connection sensors 40 indicate vehicle 10 is connected to infrastructure 24. If two of the sensors 40 generate varying outputs, controller 46 may, however, also again activate an audio, visual, and/or haptic warning system to alert the vehicle operator to a malfunctioning sensor.

If controller 46 determines that vehicle 10 is connected with infrastructure 24, the method may return to step 60. If controller 46 determines that vehicle 10 is unconnected with infrastructure 24, the method may proceed to step 72 in which controller 46 sets the vehicle state flag in memory 54 or another memory to the disarmed state before returning to step 60.

Because vehicle 10 cannot transition back from the disarmed state to the armed state without prior application of the parking brake or cycling of power below threshold speed, a false positive from the infrastructure connection signal that results from, for example, inadvertent opening of door 22 will not cause vehicle 10 to reenter the armed state even when other conditions exist—such as the speed of vehicle 10 being less than or equal to threshold speed—that appear to corroborate the infrastructure connection signal, but that may actually result from conditions occurring during the normal travel of vehicle 10 such as when vehicle 10 slows due to, for example, traffic or an object (e.g., railway tracks) in the path of travel.

Referring now to FIG. 4, the method may also include several steps intended to identify conditions in which vehicle 10 is connected to infrastructure 24 and in which application of the service brake is required to inhibit movement of vehicle 10 away from infrastructure 24. In step 74, controller 46 determines whether vehicle 10 is in an armed state or a disarmed state. As referenced hereinabove, when vehicle 10 is in the armed state, controller 46 is configured to cause application of a service brake in vehicle 10 (e.g., a wheel brake 36) if a set of conditions is present. When vehicle 10 is in the disarmed state, controller 46 will not cause application of the service brake even when the same conditions are present. Controller 46 may determine whether vehicle 10 is an armed state or disarmed state by reading the vehicle state flag from memory 54 (as previously determined according to the steps in FIG. 3).

If vehicle 10 is in the armed state, the method may proceed to steps 76, 78, 80, 82, 84, 86 in which controller 46 determines whether a set of conditions is present indicative of an attempt by the operator of vehicle 10 to pull away from infrastructure 24 that remains connected to vehicle 10. Although steps 76, 78, 80, 82, 84, 86 are shown as occurring in a particular sequence in the illustrated embodiment, it should be understood that this order is exemplary only and that, for example, steps 80, 82 could occur before steps 76, 78 or after steps 84, 86 and that steps 84, 86 could be performed before any of steps 76, 78, 80, 82. It should also be understood that certain steps among steps 76, 78, 80, 82, 84, 86 could be performed contemporaneously instead of sequentially.

In steps 76, 78, controller 46 receives a parking brake status signal indicative of whether a parking brake on vehicle 10 is in an applied state or a released state and determines whether the parking brake is in the released state. The parking brake status signal may be received from parking brake status sensor 44. As noted above, however, it should be understood that a variety of systems within vehicle 10 may monitor, and generate signals indicative of, the status of a parking brake.

If controller 46 determines that the parking brake is in the released state, the method may continue with the steps 80, 82 of receiving a vehicle speed signal indicative of a speed of vehicle 10 and determining whether the speed of vehicle 10 meets a predetermined condition relative to a threshold speed. The predetermined condition may be the same predetermined condition as in step 66 or a different predetermined condition. Controller 46 may receive the vehicle speed signal from wheel speed sensor 42. As noted above, however, it should again be understood that a variety of systems and systems within vehicle 10 may monitor, and generate signals indicative of, the speed of vehicle 10.

If controller 46 determines that the speed of vehicle 10 meets the predetermined condition relative to the threshold speed, the method may continue with the steps 84, 86 of receiving the infrastructure connection signal and determining whether the infrastructure connection signal indicates that vehicle 10 is connected to infrastructure 24 or unconnected with infrastructure 24. Controller 46 may receive the infrastructure connection signal from infrastructure connection sensor 40.

If controller 46 determines in step 86 that the vehicle 10 infrastructure connection signal indicates vehicle 10 is connected with infrastructure 24, the method may proceed to step 88 in which controller 46 directs valve 52 to assume a state in which valve 52 delivers fluid pressure from reservoir 48 to a wheel brake 36 to apply a service brake on vehicle 10. In this manner, system 34 inhibits movement of vehicle 10 when vehicle 10 is connected to infrastructure. The method may further proceed to steps 90, 92 in which controller 46 activates audio, visual and/or haptic warning systems on vehicle 10 to provide warnings (e.g., diagnostic trouble code(s)) to the vehicle operator and records (in, for example, memory 54) and/or transmits (through, for example, a telematics unit (not shown) on vehicle 10) the activation of the service brake for use in evaluating performance of vehicle 10 and the operator of vehicle 10.

If controller 46 determines in step 74 that vehicle 10 is in the disarmed state, or determines in step 78 that the parking brake is in the applied state or determines in step 82 that the speed of vehicle 10 does not meet the predetermined condition relative to the threshold speed or determines in step 86 that the infrastructure connection signal indicates vehicle 10 is unconnected with infrastructure 24, controller 46 does not perform any of steps 88,90, 92 and, in particular, refrains from directing valve 52 to assume the state in which valve 52 delivers fluid pressure from reservoir 48 to the wheel brake 36 to apply the service brake, and returns to step 74. In this manner, system 34 prevents application of the service brake when one, or even all, of the parking brake status signal (parking brake released), vehicle speed signal (low speed), and infrastructure connection signal (door open) provide indicators that the service brakes should be applied to prevent inadvertent disconnection of vehicle 10 from infrastructure 24, but which may actually occur during travel of vehicle 10 when vehicle is unconnected with infrastructure 24.

A system 34 and method for inhibiting movement of a vehicle 10 away from infrastructure 24 temporarily connected with the vehicle 10 in accordance with the teachings disclosed herein is advantageous relative to conventional systems. Using information regarding the current state of the vehicle 10 in addition to information regarding the state of connection of the vehicle 10 to the infrastructure 24, the speed of the vehicle 10 and the status of the vehicle parking brake, the system 34 and method are able to inhibit movement of the vehicle 10 when the vehicle 10 is connected to infrastructure 24, but also avoid false positives that may occur during vehicle travel including during periods of vehicle travel when the vehicle 10 is traveling at relatively low speeds or idle. As a result, the system 34 and method inhibit movement of a vehicle 10 away from connected infrastructure 24 without creating additional risks of damage to the vehicle 10 or surrounding vehicles during vehicle travel or safety risk or inconvenience for the vehicle operator or other persons in the vicinity of the vehicle.

While the invention has been shown and described with reference to one or more particular embodiments thereof, it will be understood by those of skill in the art that various changes and modifications can be made without departing from the spirit and scope of the invention.

What is claimed is:

1. A system for inhibiting movement of a vehicle away from infrastructure temporarily connected with the vehicle, comprising:

an infrastructure connection sensor on the vehicle configured to generate an infrastructure connection signal indicative of whether the vehicle is connected with the infrastructure or unconnected with the infrastructure;

a valve configured to control delivery of fluid pressure to a service brake on the vehicle; and, a controller configured to receive the infrastructure connection signal;

receive a parking brake status signal indicative of whether a parking brake on the vehicle is in an applied state or a released state;

receive a vehicle speed signal indicative of a speed of the vehicle;

determine whether the vehicle is in (i) an armed state permitting application of the service brake when a set of conditions is present in which the parking brake status signal indicates that the parking brake is in the released state, the speed of the vehicle meets a first predetermined condition relative to a threshold speed, and the infrastructure connection signal indicates the vehicle is connected with the infrastructure or (ii) a disarmed state prohibiting application of the service brake when the set of conditions is present;

determine whether the set of conditions is present; and, direct, when the vehicle is in the armed state and the set of conditions is present, the valve to assume a first state in which the valve causes application of the service brake.

2. The system of claim 1 wherein the controller is further configured to refrain from directing the valve to assume the first state when the vehicle is in the disarmed state or the parking brake status signal indicates that the parking brake is in the applied state or the speed of the vehicle does not meet the first predetermined condition relative to the threshold speed or the infrastructure connection signal indicates the vehicle is unconnected with the infrastructure.

3. The system of claim 1 wherein the controller is further configured, when the vehicle is in the armed state, to set a vehicle state flag to a value indicative of the disarmed state when the parking brake status signal indicates that the parking brake is in the released state and the speed of the vehicle does not meet the first predetermined condition relative to the threshold speed.

4. The system of claim 1 wherein the controller is further configured, when the vehicle is in the armed state, to set a vehicle state flag to a value indicative of the disarmed state when the parking brake status signal indicates that the parking brake is in the released state, the speed of the vehicle does not meet the first predetermined condition relative to the threshold speed, and the infrastructure connection signal indicates the vehicle is unconnected with the infrastructure.

5. The system of claim 1 wherein the controller is further configured, when the vehicle is in the armed state, to set a vehicle state flag to a value indicative of the disarmed state when the parking brake status signal indicates that the parking brake is in the released state and the speed of the vehicle does not meet a second predetermined condition relative to the threshold speed, the second predetermined condition being different from the first predetermined condition.

6. The system of claim 1 wherein the controller is further configured, when the vehicle is in the armed state, to set a vehicle state flag to a value indicative of the disarmed state when the parking brake status signal indicates that the parking brake is in the released state, the speed of the vehicle does not meet a second predetermined condition relative to the threshold speed, the second predetermined condition being different from the first predetermined condition, and the infrastructure connection signal indicates the vehicle is unconnected with the infrastructure.

7. The system of claim 1 wherein the controller is further configured, when the vehicle is in the disarmed state, to set a vehicle state flag to a value indicative of the armed state when the parking brake status signal indicates that the parking brake is in the applied state.

8. The system of claim 1 wherein the controller is further configured to set a vehicle state flag to a value indicative of the armed state upon activation of the vehicle.

9. The system of claim 1 wherein the infrastructure connection sensor comprises a position sensor configured to determine whether a door on the vehicle controlling access to a connector for the infrastructure is in an open position or a closed position.

10. The system of claim 1 wherein the infrastructure connection sensor comprises a current sensor on the vehicle configured to determine whether current is flowing from the infrastructure to the vehicle.

11. The system of claim 1 further comprising a wheel speed sensor, the wheel speed sensor configured to generate the vehicle speed signal.

12. An article of manufacture, comprising:

a non-transitory computer storage medium having a computer program encoded thereon that when executed by a controller inhibits movement of a vehicle away from infrastructure temporarily connected with the vehicle, the computer program including code for, receiving an infrastructure connection signal indicative of whether the vehicle is connected with the infrastructure or unconnected with the infrastructure;

receiving a parking brake status signal indicative of whether a parking brake on the vehicle is in an applied state or a released state;

receiving a vehicle speed signal indicative of a speed of the vehicle;

determining whether the vehicle is in (i) an armed state permitting application of a service brake on the vehicle when a set of conditions is present in which the parking brake status signal indicates that the parking brake is in the released state, the speed of the vehicle meets a first predetermined condition relative to a threshold speed, and the infrastructure connection signal indicates the vehicle is connected with the infrastructure or (ii) a disarmed state prohibiting application of the service brake when the set of conditions is present;

determining whether the set of conditions is present; and, directing, when the vehicle is in the armed state and the set of conditions is present, a valve to assume a first state in which the valve causes application of the service brake.

13. The article of manufacture of claim 12 wherein the computer program further includes code for refraining from directing the valve to assume the first state when the vehicle is in the disarmed state or the parking brake status signal indicates that the parking brake is in the applied state or the speed of the vehicle does not meet the first predetermined condition relative to the threshold speed or the infrastructure connection signal indicates the vehicle is unconnected with the infrastructure.

14. The article of manufacture of claim 12 wherein the computer program further includes code for setting, when the vehicle is in the armed state, a vehicle state flag to a value indicative of the disarmed state when the parking brake status signal indicates that the parking brake is in the released state and the speed of the vehicle does not meet the first predetermined condition relative to the threshold speed.

15. The article of manufacture of claim 12 wherein the computer program further includes code for setting, when the vehicle is in the armed state, a vehicle state flag to a value indicative of the disarmed state when the parking brake status signal indicates that the parking brake is in the released state, the speed of the vehicle does not meet the first predetermined condition relative to the threshold speed, and the infrastructure connection signal indicates the vehicle is unconnected with the infrastructure.

16. The article of manufacture of claim 12 wherein the computer program further includes code for setting, when the vehicle is in the armed state, a vehicle state flag to a value indicative of the disarmed state when the parking brake status signal indicates that the parking brake is in the released state and the speed of the vehicle does not meet a second predetermined condition relative to the threshold speed, the second predetermined condition being different from the first predetermined condition.

17. The article of manufacture of claim 12 wherein the computer program further includes code for setting, when the vehicle is in the armed state, a vehicle state flag to a value indicative of the disarmed state when the parking brake status signal indicates that the parking brake is in the released state, the speed of the vehicle does not meet a second predetermined condition relative to the threshold speed, the second predetermined condition being different from the first predetermined condition, and the infrastructure connection signal indicates the vehicle is unconnected with the infrastructure.

18. The article of manufacture of claim 12 wherein the computer program further includes code for setting, when the vehicle is in the disarmed state, a vehicle state flag to a value indicative of the armed state when the parking brake status signal indicates that the parking brake is in the applied state.

19. The article of manufacture of claim 12 wherein the computer program further includes code for setting a vehicle state flag to a value indicative of the armed state upon activation of the vehicle.

20. The article of manufacture of claim 12 wherein the infrastructure connection signal is generated by a position sensor configured to determine whether a door on the vehicle controlling access to a connector for the infrastructure is in an open position or a closed position.

21. The article of manufacture of claim 12 wherein the infrastructure connection signal is generated by a current sensor on the vehicle configured to determine whether current is flowing from the infrastructure to the vehicle.

22. The article of manufacture of claim 12 wherein the vehicle speed signal is generated by a wheel speed sensor.

23. A method for inhibiting movement of a vehicle away from infrastructure temporarily connected with the vehicle, comprising:

receiving an infrastructure connection signal indicative of whether the vehicle is connected with the infrastructure or unconnected with the infrastructure;

receiving a parking brake status signal indicative of whether a parking brake on the vehicle is in an applied state or a released state;

receiving a vehicle speed signal indicative of a speed of the vehicle;

determining whether the vehicle is in (i) an armed state permitting application of a service brake on the vehicle when a set of conditions is present in which the parking brake status signal indicates that the parking brake is in the released state, the speed of the vehicle meets a first predetermined condition relative to a threshold speed, and the infrastructure connection signal indicates the vehicle is connected with the infrastructure or (ii) a disarmed state prohibiting application of the service brake when the set of conditions is present;

determining whether the set of conditions is present; and, directing, when the vehicle is in the armed state and the set of conditions is present, a valve to assume a first state in which the valve causes application of the service brake.

24. The method of claim 23, further comprising refraining from directing the valve to assume the first state when the vehicle is the disarmed state or the parking brake status signal indicates that the parking brake is in the applied state or the speed of the vehicle does not meet the first predetermined condition relative to the threshold speed or the infrastructure connection signal indicates the vehicle is unconnected with the infrastructure.

25. The method of claim 23, further comprising setting, when the vehicle is in the armed state, a vehicle state flag to a value indicative of the disarmed state when the parking brake status signal indicates that the parking brake is in the released state and the speed of the vehicle does not meet the first predetermined condition relative to the threshold speed.

26. The method of claim 23, further comprising setting, when the vehicle is in the armed state, a vehicle state flag to a value indicative of the disarmed state when the parking brake status signal indicates that the parking brake is in the released state, the speed of the vehicle does not meet the first predetermined condition relative to the threshold speed, and the infrastructure connection signal indicates the vehicle is unconnected with the infrastructure.

27. The method of claim 23, further comprising setting, when the vehicle is in the armed state, a vehicle state flag to a value indicative of the disarmed state when the parking brake status signal indicates that the parking brake is in the released state and the speed of the vehicle does not meet a second predetermined condition relative to the threshold speed, the second predetermined condition being different from the first predetermined condition.

28. The method of claim 23, further comprising setting, when the vehicle is in the armed state, a vehicle state flag to a value indicative of the disarmed state when the parking brake status signal indicates that the parking brake is in the released state, the speed of the vehicle does not meet a second predetermined condition relative to the threshold speed, the second predetermined condition being different from the first predetermined condition, and the infrastructure connection signal indicates the vehicle is unconnected with the infrastructure.

29. The method of claim 23, further comprising setting, when the vehicle is in the disarmed state, a vehicle state flag to a value indicative of the armed state when the parking brake status signal indicates that the parking brake is in the applied state.

30. The method of claim 23, further comprising setting a vehicle state flag to a value indicative of the armed state upon activation of the vehicle.

31. The method of claim 23 wherein the infrastructure connection signal is generated by a position sensor configured to determine whether a door on the vehicle controlling access to a connector for the infrastructure is in an open position or a closed position.

32. The method of claim 23 wherein the infrastructure connection signal is generated by a current sensor on the vehicle configured to determine whether current is flowing from the infrastructure to the vehicle.

33. The method of claim 23 wherein the vehicle speed signal is generated by a wheel speed sensor.

* * * * *